(12) United States Patent
Accapadi et al.

(10) Patent No.: US 7,464,237 B2
(45) Date of Patent: Dec. 9, 2008

(54) SYSTEM AND METHOD FOR IMPLEMENTING A FAST FILE SYNCHRONIZATION IN A DATA PROCESSING SYSTEM

(75) Inventors: Jos M. Accapadi, Austin, TX (US); Mathew Accapadi, Austin, TX (US); Andrew Dunshea, Austin, TX (US); Dirk Michel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 11/259,898

(22) Filed: Oct. 27, 2005

(65) Prior Publication Data
US 2007/0101052 A1 May 3, 2007

(51) Int. Cl.
*G06F 12/00* (2006.01)
(52) U.S. Cl. .................. 711/162; 711/112; 711/161; 202/204; 202/205
(58) Field of Classification Search .................. 711/112, 711/162
See application file for complete search history.

(56) References Cited

U.S. PATENT DOCUMENTS

| 4,742,450 A | 5/1988 | Duvall et al. |
| 5,574,902 A | 11/1996 | Josten et al. |
| 7,054,927 B2 * | 5/2006 | Ulrich et al. ................. 709/223 |
| 7,246,211 B1 * | 7/2007 | Beloussov et al. .......... 711/162 |
| 2006/0253501 A1 * | 11/2006 | Langan et al. ................ 707/201 |

OTHER PUBLICATIONS

Duvall et al., Enforced Page Data Integrity for Mapped File Memory Segments, IBM Technical Disclosure Bulletin, Oct. 1986, pp. 2294-2295.
Using sync/fsync Calls, Performance Management Guide, Jun. 17, 2005, <http://publibn.boulder.ibm.com/doc_link/en_US/a_doc_lib/aixbman/prftungd/2365c815.htm>.

* cited by examiner

*Primary Examiner*—Kevin Ellis
*Assistant Examiner*—Hashem Farrokh
(74) *Attorney, Agent, or Firm*—Dillon & Yudell LLP

(57) ABSTRACT

A system and method for implementing a fast file synchronization in a data processing system. A memory management unit divides a file stored in system memory into a collection of data block groups. In response to a master (e.g., processing unit, peripheral, etc.) modifying a first data block group among the collection of data block groups, the memory management unit writes a first block group number associated with the first data block group to system memory. In response to a master modifying a second data block group, the memory management unit writes the first data block group to a hard disk drive and writes a second data block group number associated with the second data block group to system memory. In response to a request to update modified data block groups of the file stored in the system memory to the hard disk drive, the memory management unit writes the second data block to the hard disk drive.

3 Claims, 3 Drawing Sheets

SYSTEM AND METHOD FOR IMPLEMENTING A FAST FILE SYNCHRONIZATION IN A DATA PROCESSING SYSTEM

BACKGROUND OF THE INVENTION

1. Technical Field

The present invention relates in general to the field of data processing systems. More particularly, the present invention relates to the field of memory management in data processing systems. Still more particularly, the present invention relates to a system and method for fast file synchronization in data processing systems.

2. Description of the Related Art

In modern data processing systems, random access memories (RAM) are frequently utilized to cache read and write accesses to files stored on secondary storage devices such as hard disk drives. Write access to these files may be non-synchronous (i.e., modifications may be made to the file stored in RAM without modifying the copy of the file stored in the hard disk drive) and still be considered complete write accesses.

Generally, copies of the files stored RAM must be synchronized with the corresponding copies stored on the hard disk drive. Increasing RAM and file sizes result in lengthening file synchronization times. Therefore, there is a need for a system and method for fast file synchronization within data processing systems.

SUMMARY OF THE INVENTION

The present invention includes a system and method for implementing a fast file synchronization in a data processing system. A memory management unit divides a file stored in system memory into a collection of data block groups. In response to a master (e.g., processing unit, peripheral, etc.) modifying a first data block group among the collection of data block groups, the memory management unit writes a first block group number associated with the first data block group to system memory. In response to a master modifying a second data block group, the memory management unit writes the first data block group to a hard disk drive and writes a second data block group number associated with the second data block group to system memory. In response to a request to update modified data block groups of the file stored in the system memory to the hard disk drive, the memory management unit writes the second data block to the hard disk drive.

The above-mentioned features, as well as additional objectives, features, and advantages of the present invention will become apparent in the following detailed description.

BRIEF DESCRIPTION OF THE FIGURES

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
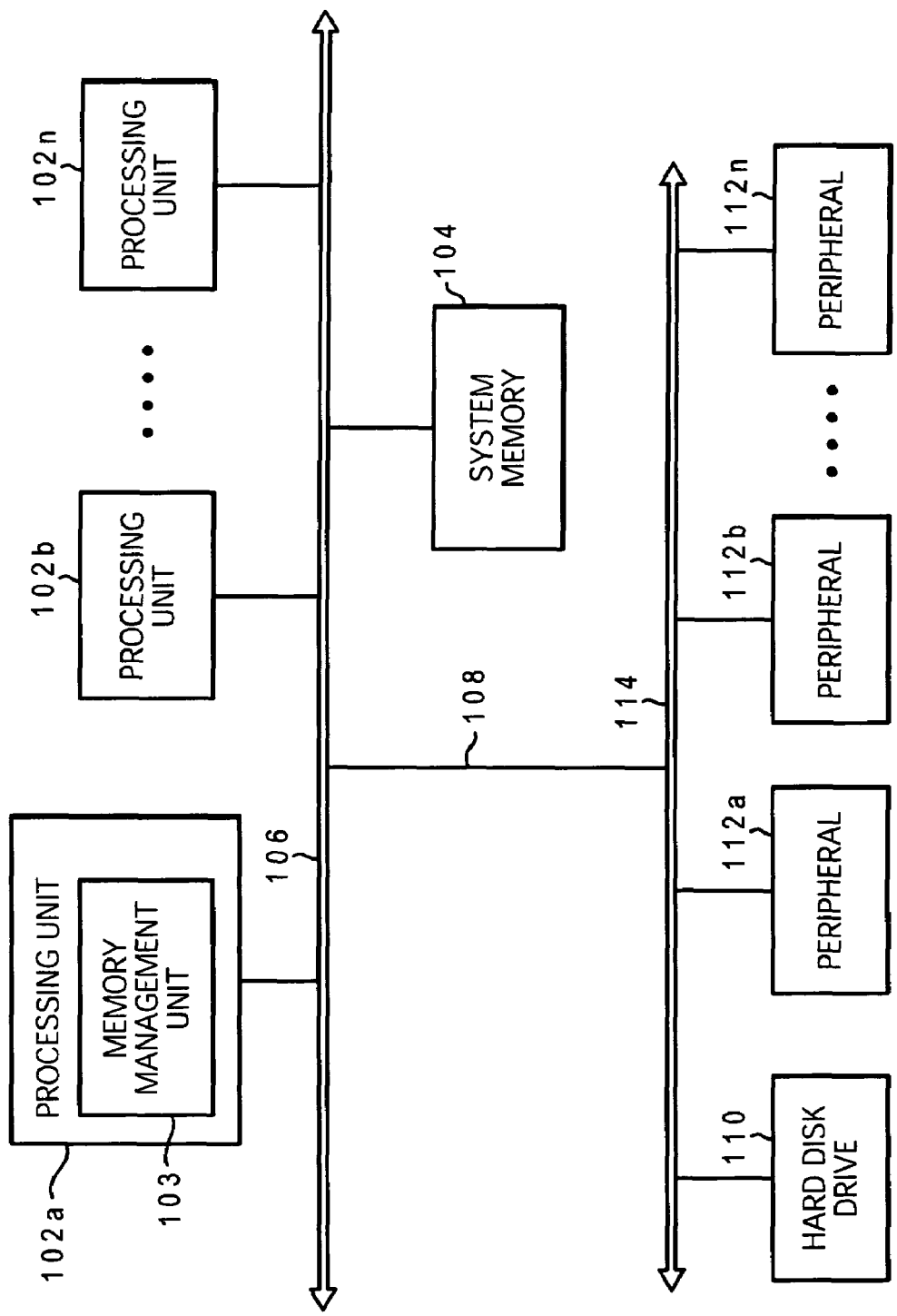
FIG. 1 illustrates a block diagram of an exemplary data processing system in which a preferred embodiment of the present invention may be implemented.

With reference now to the figures, and in particular to FIG. 1, there is depicted a block diagram of an exemplary data processing system in which a preferred embodiment of the present invention may be implemented. As depicted, exemplary data processing system 100 includes processing unit(s) 102a-n, which are coupled to system memory 104 via system bus 106. As illustrated, at least one processing unit 102a-n includes a memory management unit 103 for controlling access between different levels of a memory hierarchy. As well-known to those with skill in the art, the memory system of modern data processing systems (e.g., data processing system 100) is organized as a hierarchy, where the memory unit closer to the processing units is a subset of any level further away, and all the data or instructions is stored at the lowest level, usually a hard disk, optical, or tape drive. The memory components closer to the processing unit, usually a cache hierarchy or system memory 104 have lower latency access times than a lower level, such as the hard disk drive 110. Therefore, it is advantageous to store frequently accessed instructions and/or data in cache or system memory 104 for quicker access times. Only when requested instructions and/or data is not available in the cache or system memory 104 is hard disk drive 110 accessed.

Preferably, system memory 104 may be implemented as a collection of dynamic random access memory (DRAM) modules. Typically, system memory 104 includes data and instructions for running a collection of applications. Mezzanine bus 108 acts as an intermediary between system bus 106 and peripheral bus 114. Those with skill in the art will appreciate that peripheral bus 114 may be implemented as a peripheral component interconnect (PCI), accelerated graphics port (AGP), or any other peripheral bus. Coupled to peripheral bus 114 is hard disk drive 110, which is utilized by data processing system 100 as a mass storage device. Also coupled to peripheral bus 114 is a collection of peripherals 112a-n.

Those skilled in the art will appreciate that data processing system 100 can include many additional components not specifically illustrated in FIG. 1. Because such additional components are not necessary for an understanding of the present invention, they are not illustrated in FIG. 1 or discussed further herein. It should also be understood, however, that the enhancements to data processing system 100 to improve handling of shared resources provided by the present invention are applicable to data processing systems of any system architecture and are in no way limited to the generalized multi-processor architecture or symmetric multi-processing (SMP) architecture illustrated in FIG. 1.

Figure 2:
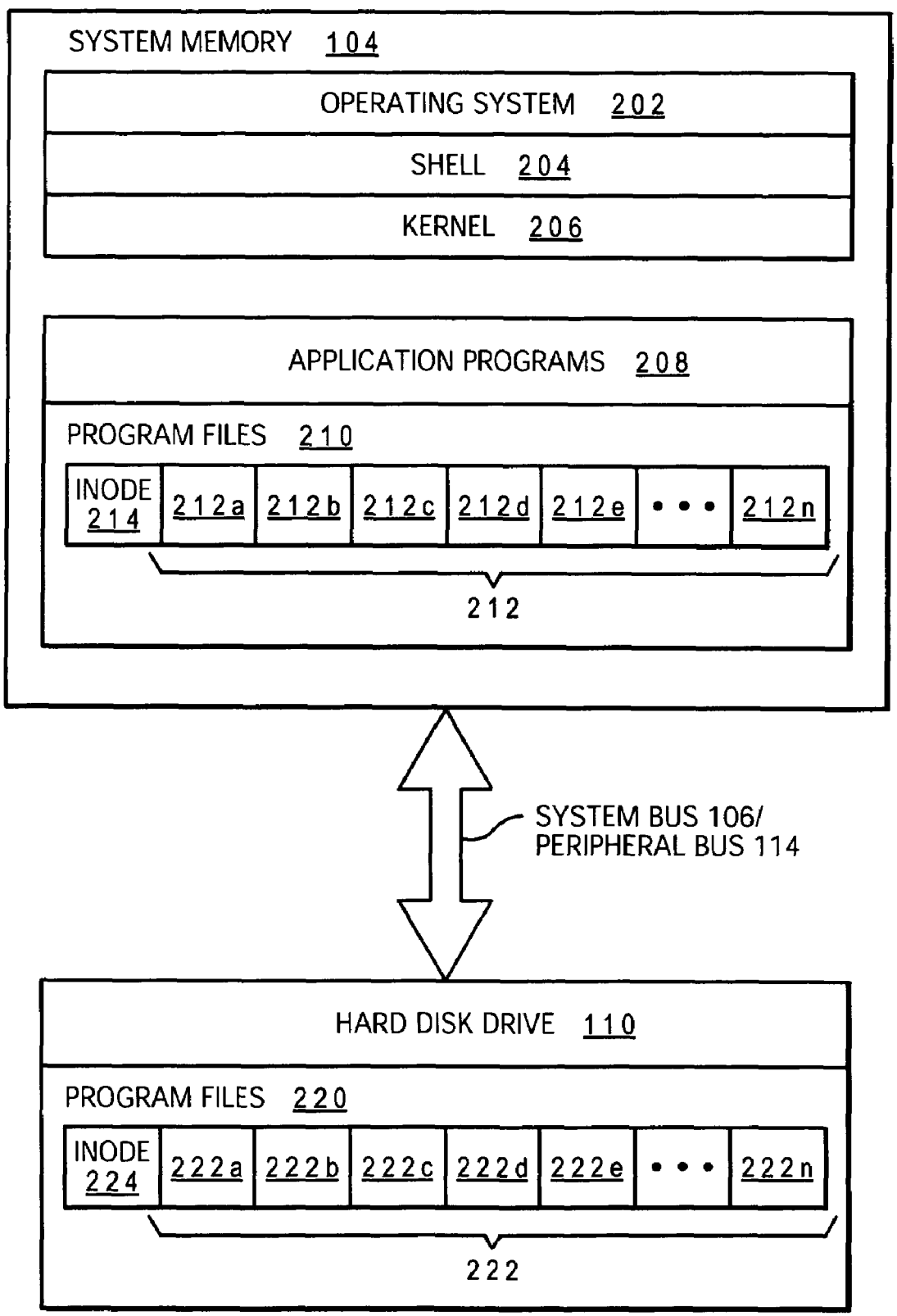
FIG. 2 depicts a block diagram of the contents of an exemplary system memory and hard disk drive according to a preferred embodiment of the present invention.

FIG. 2 is a block diagram depicting exemplary contents of system memory 104 and hard disk drive 110 illustrated in FIG. 1 according to a preferred embodiment of the present invention. As depicted, data that populates system memory 104 includes operating system 202, application programs 208, and program files 210.

Operating system 202 includes a shell 204 for providing transparent user access to resources such as application programs 208. Generally, shell 204 is a program that provides an interpreter and an interface between the user and the operating system. More specifically, shell 204 executes commands that are entered into a command line user interface or from a file. Thus, shell 204 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., kernel 206) for processing. Note that while shell 204 is a text-based, line-oriented user interface, the present invention will support other user interface modes such as graphical, voice, gestural, etc equally well.

As depicted, operating system 202 also includes kernel 206, which includes lower levels of functionality for operating system 202, including providing essential services required by other parts of operating system 202 and application programs 208, including memory management, process and task management, disk management, and mouse and keyboard management.

Applications programs 208 may include any program such as a word processor, spreadsheet, web browser, etc. Also including in system memory 104 are program files 210. Program files 210 may include data and/or instructions utilized by application programs 208 and/or operating system 202 to perform system tasks. In a preferred embodiment of the present invention, file 212 is divided into a number of data block groups 212*a-n*. Associated with file 212 is file descriptor 214 (hereinafter referenced as "inode" in FIG. 2), which is preferably a data structure that stores data describing features of file 212 including, but not limited to: the name, location, modification time, access time, the number of the last data block group modified, etc. of file 212.

Hard disk drive 110 is coupled to system memory 104 by system bus 106 and peripheral bus 114, as previously discussed in conjunction with FIG. 1. Hard disk drive 110 stores a collection of program files 220, which includes file 222. As previously discussed, many computer systems implement a memory hierarchy that includes, but is not limited to a cache, a system memory, and a secondary storage device, such as hard disk drive 110. Typically, an access to a cache results in a low-latency access penalty, but the cache has minimal storage capacity. On the other hand, a secondary storage device has a high-latency access penalty, but has very large storage capacity. Therefore, it is desirable for frequently accessed data or instructions to be stored in a cache or system memory 104 and hard disk drive 110 is only accessed when requested data or instructions are not found in the cache or system memory 104. However, modifications of data and/or instructions stored in cache or system memory 104 will result in a coherency problem, where the master copies of the data and/or instructions stored in hard disk drive 110 do not reflect the modifications. To ensure coherency between all levels of the memory hierarchy, the master copies of files stored in hard disk drive 110 must be updated with the copies stored in cache and/or system memory 104.

Still referring to FIG. 2, local file 212 is a copy of master file 222 that is stored in system memory 104. In a preferred embodiment of the present invention, when a data block group within file 212 (e.g., data block group 212*a*) is modified by either operating system 202 or one of application programs 208, the data block group number of the modified data block group (in this case, data block group 212*a*) is written to inode 214 and any previously-modified data block group is updated to hard disk drive 110. The interaction between system memory 104 and hard disk drive 110.

Figure 3:
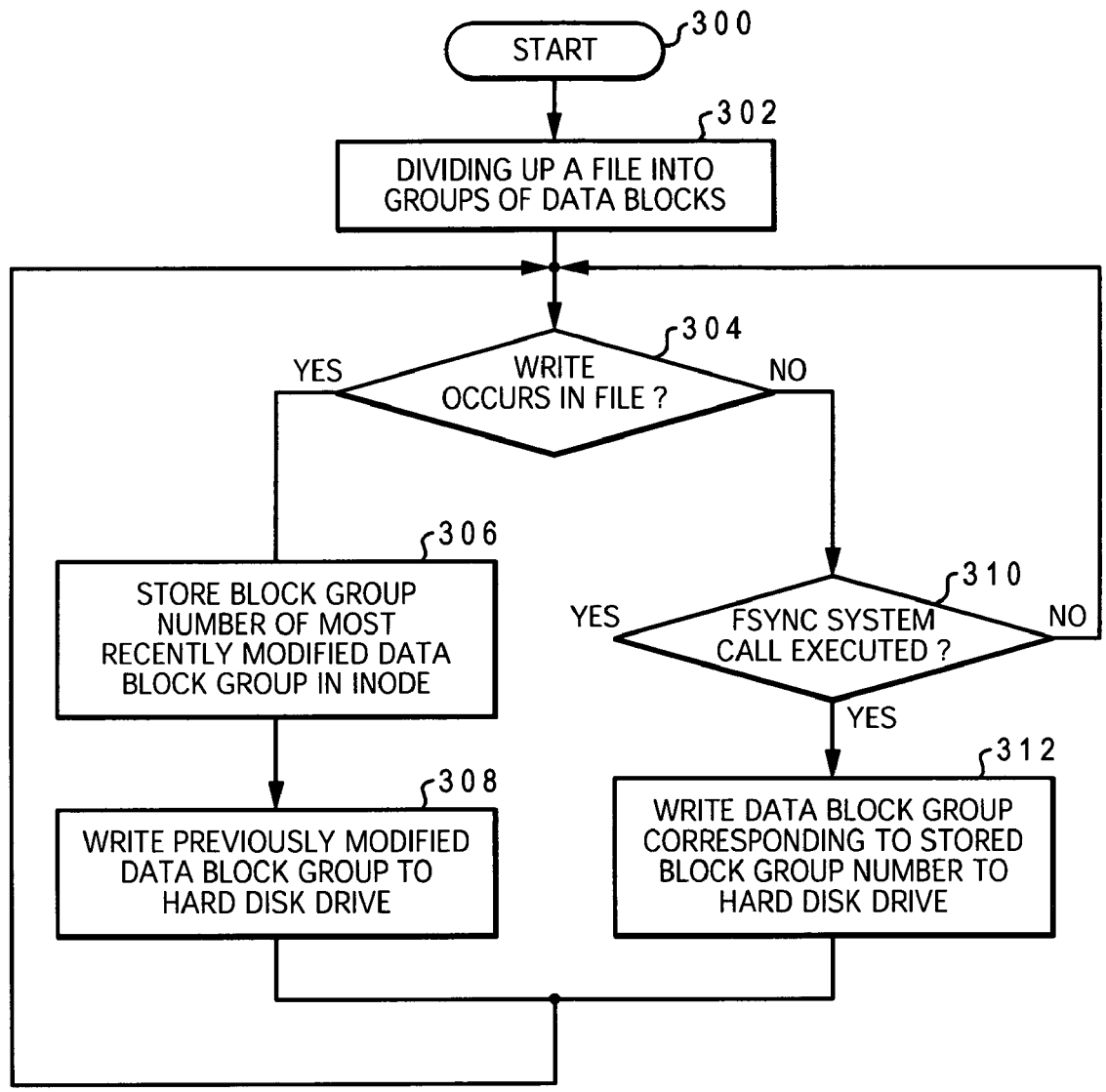
FIG. 3 is a high-level logical flowchart of an exemplary method of implementing a fast file synchronization in a data processing system according to a preferred embodiment of the present invention.

FIG. 3 is a high-level logical flowchart diagram illustrating an exemplary method of implementing a fast file synchronization according to a preferred embodiment of the present invention.

As previously discussed, the prior art requires an update to master file 222 be made only when a synchronization between file 212 and master file 222 is requested by an application program 208. If file 212 is a large file, the synchronization step latency could be prohibitively lengthy. Therefore, the present invention provides a fast file synchronization by periodically updating master file 222 with any modifications made to file 212 stored in system memory 104. Inode 214 stores the most-recently modified data block group (e.g., data block group 212*a*) of file 212. If another data block group is subsequently modified (e.g., data block group 212*b*), a data block group number associated with data block group 212*b* is stored in inode 214 to indicate that data block group 212*b* is now the most-recently modified data block group and data block group 212*a* is written to the corresponding data block group (e.g., data block group 222*a*) of master file 222 stored in hard disk drive 110. If an file synchronization system call (hereinafter referred to as an "fsync system call") is executed by an application program 208 (or any other program stored within data processing system 100), only the most-recently modified data block group (e.g., in this case, data block group 212*b*) is sent to hard disk drive 110, thus greatly reducing the synchronization step latency.

The process begins at step 300 and continues to step 302, which illustrates a file (e.g., file 212) being divided up into groups of data blocks. Those will skill in this art will appreciate that the process described in step 302 may be performed at any time after a copy of file 212 is stored in system memory 104. The process depicted in step 302 may also be performed by processor(s) 102*a-n*, operating system 202, any application program 208, memory management unit 103 or any other method or component within data processing system 100. In a preferred embodiment of the present invention, file 212 is divided into block groups of predetermined number of 4 Kbyte-sized pages. Preferably, there is no limit on the number of block groups.

The process continues to step 304, which depicts memory management unit 103 determining whether file 212 has been modified with a write command from a master (e.g., processing unit 102*a-n*, peripherals 112*a-n*, etc.). If file 212 has been modified with a write command, the process continues to step 306, which illustrates memory management unit 103 storing the block group number of the most recently modified data block group of file 212 in inode 214. The process proceeds to step 308, which illustrates memory management unit 103 writing the previously modified data block group to hard disk drive 110. The process then returns to step 304 and continues in an iterative fashion.

Returning to step 304, if file 212 has not been modified with a write command, the process transitions to step 310, which illustrates whether an fsync system call has been executed on file 212. In a preferred embodiment of the present invention, an fsync system call requests all modifications to a specific file (e.g., file 212) stored in system memory 104 to be updated to the corresponding master file (e.g., master file 222) stored in hard disk drive 110. Those with skill in the art will appreciate that the present invention is not limited to requiring that an "fsync" system call be utilized. Any system call that performs a file update may be utilized to implement the present invention.

If an fsync system call has been executed, memory management unit 103 examines inode 214, retrieves the data block group number of the most recently modified data block group in file 212, and updates the most recently modified data block group to master file 222 in hard disk drive 110, as depicted in step 312. The process returns to step 304 and proceeds in an iterative fashion. If an fsync system call has not been executed, the process returns to step 304 and proceeds in an iterative fashion.

As disclosed, the present invention includes a system and method for implementing a fast file synchronization in a data processing system. A memory management unit divides a file stored in system memory into a collection of data block groups. In response to a master (e.g., processing unit, peripheral, etc.) modifying a first data block group among the collection of data block groups, the memory management unit writes a first block group number associated with the first data block group to system memory. In response to a master modifying a second data block group, the memory management unit writes the first data block group to a hard disk drive and writes a second data block group number associated with the second data block group to system memory. In response to a request to update modified data block groups of the file stored in the system memory to the hard disk drive, the memory management unit writes the second data block to the hard disk drive.

It should be understood that at least some aspects of the present invention may alternatively be implemented in a computer-usable medium that contains a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD-ROM, optical media), and communication media, such as computer and telephone networks including Ethernet, the Internet, wireless networks, and like network systems. It should be understood, therefore, in such signal-bearing media when carrying or encoding computer readable instructions that the direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it would be understood by those skilled in the art that various changes in form and detail may be made therein without departing from the spirit and scope of the invention.

What is claimed is:

1. A method comprising:
    dividing a file stored in system memory into a plurality of data block groups;
    associating said plurality of data block groups with a plurality of block group numbers;
    in response to modifying a first data block group among said plurality of data block groups, writing a first block group number among said plurality of block group numbers associated with said first data block group to said system memory;
    in response to modifying a second data block group among said plurality of data block groups, writing said first data block group to a hard disk drive and writing a second block group number among said plurality of data block group numbers associated with said second data block group to system memory; and
    in response to a request to update modified data blocks of said file stored in said system memory to said hard disk drive, writing said second data block group to said hard disk drive.

2. The method according to claim 1, wherein said dividing further comprises:
    dividing said file stored in system memory into said plurality of data block groups, wherein said plurality of data block groups are 4 Kbyte-sized pages.

3. The method according to claim 1, wherein said dividing further comprises:
    dividing said file stored in system memory into a predetermined number of data block groups.

* * * * *